Ittner et al.

United States Patent [19]

[11] Patent Number: 4,491,265

[45] Date of Patent: Jan. 1, 1985

[54] METHOD OF ALIGNING HONEYCOMB CELLS

[76] Inventors: Nelson C. Ittner, P.O. Box 2610, Blue Jay, Calif. 92317; Gary N. Ittner, 12610 Braddock Dr., Los Angeles, Calif. 90066

[21] Appl. No.: 501,605

[22] Filed: Jun. 6, 1983

[51] Int. Cl.³ .......................... B23K 1/12; B23K 35/14
[52] U.S. Cl. .................................. 228/181; 228/247; 228/249; 228/56
[58] Field of Search ............... 228/181, 185, 189, 204, 228/245, 246, 249, 252, 258, 173 C, 56, 247

[56] References Cited

U.S. PATENT DOCUMENTS 3,057,057  10/1962  Langhans ........................... 228/181
3,948,431  4/1976   Niimi ................................. 228/181
4,032,057  6/1977   Linscott ........................... 228/56 R
4,333,548  6/1982   Ittner ................................. 228/181
4,411,381  10/1983  Ittner ................................. 228/181

Primary Examiner—Kenneth J. Ramsey
Assistant Examiner—C. McKee
Attorney, Agent, or Firm—Ralph B. Pastoriza

[57] ABSTRACT

A continuous strip of brazing foil is partially folded about transverse parallel fold lines in a repetitive pattern. When this strip is positioned between the nodes of honeycomb cells the fold lines will index the cells into proper alignment for assembly. The brazing strip also serves its normal function of providing brazing material for attaching the assembly to other components.

5 Claims, 4 Drawing Figures

METHOD OF ALIGNING HONEYCOMB CELLS

FIELD OF THE INVENTION

This invention relates generally to honeycomb structures and more particularly to a method of aligning honeycomb cells for welding or bonding of the cell nodes together in forming a honeycomb cell array.

BACKGROUND OF THE INVENTION

In the manufacture of honeycomb cell arrays, it is often difficult to hold the flexible honeycomb material in alignment for welding or bonding of the cell nodes together. The problem is particularly acute when the cells are small; for example, less than one twelfth inch across.

Heretofore, proper holding of the cells in alignment has been accomplished by the use of small indexing pins or balls. These pins or balls, whichever is used, interfere with the use of a continuous strip of brazing material when attempting to position the same between the nodes of the cells preparatory to bonding the nodes together. Further, the necessity for providing indexing pins or balls increases the overall cost of honeycomb cell production.

In U.S. Pat. No. 4,333,598 assigned to the same assignee as the present invention, there is disclosed a basic method of brazing honeycomb and panel assemblies using a continuous strip of brazing material. This prior patent, however, does not deal with the specific problem of alignment of the honeycomb cell nodes for initial welding or bonding.

In copending patent application Ser. No. 364,808 filed Apr. 2, 1982 and entitled HONEYCOMB MANUFACTURING METHOD, now U.S. Pat. No. 4,411,381, also owned by the same assignee as the present application, there is taught a method of forming honeycomb cell arrays into a cylindrical configuration in which the lateral walls are maintained rectilinear; in other words, the "hourglass" effect is avoided. As in the case of the previous mentioned U.S. patent, this latter application is also not concerned with alignment of the nodes of the honeycomb cells preparatory to welding or bonding of the same.

It is to be understood, however, that the method of the present invention is applicable to the various operations described in both of the above-mentioned prior cases.

BRIEF DESCRIPTION OF THE PRESENT INVENTION

Bearing the foregoing in mind, the present invention contemplates a method of aligning honeycomb cells in a desired array wherein the cell nodes receive a continuous strip of brazing foil, without the need for special indexing pins or balls.

More particularly, in accord with the method, the brazing foil strip is folded about transverse parallel pairs of fold lines spaced apart the same distance as the nodes of properly horizontally aligned cells, the transverse fold lines in each pair being spaced apart a distance equal to the length of the cell node. The brazing strip is then positioned between the cell nodes so that a cell node is positioned between the two transverse fold lines making up each pair. As a consequence, the brazing strip essentially indexes the positions of the cells into alignment with each other.

The present invention thus takes advantage of the continuous brazing strip by having it serve two functions. First, the brazing strip itself provides the brazing material for ultimate brazing of the assembled cells and panels, and second, the brazing strip by being preshaped serves to index the various honeycomb cells into proper alignment preparatory to the welding of the nodes together.

BRIEF DESCRIPTION OF THE DRAWINGS

A better understanding of this invention will be had by now referring to the accompanying drawings in which.

DETAILED DESCRIPTION OF THE INVENTION

Figure 1:
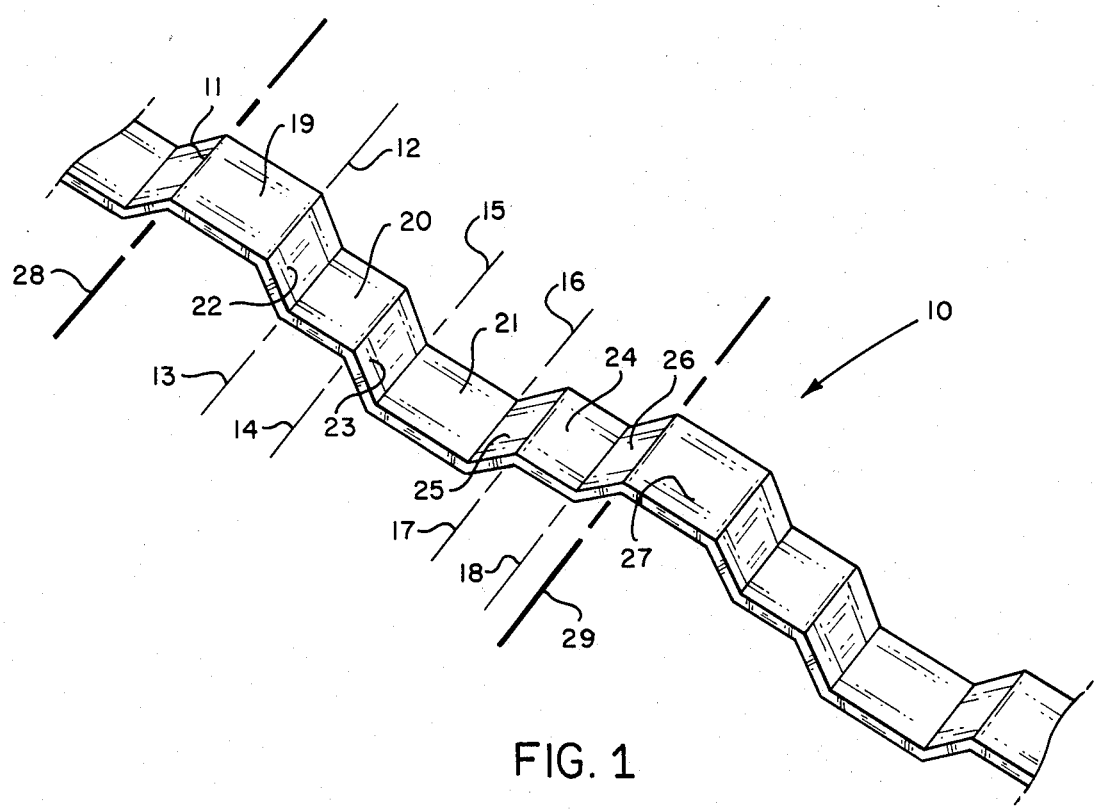
FIG. 1 is a perspective view of a portion of a brazing foil strip shaped in a specific repetitive pattern in accord with the present invention.

Referring first to FIG. 1, there is shown a strip of brazing foil designated generally by the numeral 10. This brazing foil is normally provided in the form of a continuous flat strip which is positioned between the nodes of honeycomb cells made by corrugating appropriate strips of material making up the honeycomb cells.

In accord with a first step of the method of aligning the honeycomb cells preparatory to welding, the strip 10 of FIG. 1 is partially folded about transverse parallel fold lines indicated at 11, 12, 13, 14, 15, 16, 17, and 18, in both clockwise and counterclockwise directions to define a series of descending and ascending steps defining a pattern. The particular pattern of steps repeats and thus a detailed description of one pattern will be sufficient to define the repetitive shaping of the strip.

Thus, still referring to FIG. 1 there is shown in the upper left portion of the drawing a top step 19 defined between the fold lines 11 and 12, a first intermediate step 20 defined between the fold lines 13 and 14 and a bottom step 21 defined between the fold lines 15 and 16. Two downwardly sloping sections 22 and 23 connect respectively the top step to the intermediate step and the intermediate step to the bottom step.

Still referring to FIG. 1, there is shown a second intermediate step 24 defined between the fold lines 17 and 18 and two upwardly sloping sections 25 amd 26 connecting the bottom step 21 to the second intermediate step 24 and the second intermediate step 24 to the next top step 27 of the next pattern.

The steps and sloping sections described making up the one pattern are defined between the heavy section lines 28 and 29 of FIG. 1. It will be understood that an identical pattern repeats after the section line 29 starting with the top step 27 which would correspond with the top step 19.

Figure 2:
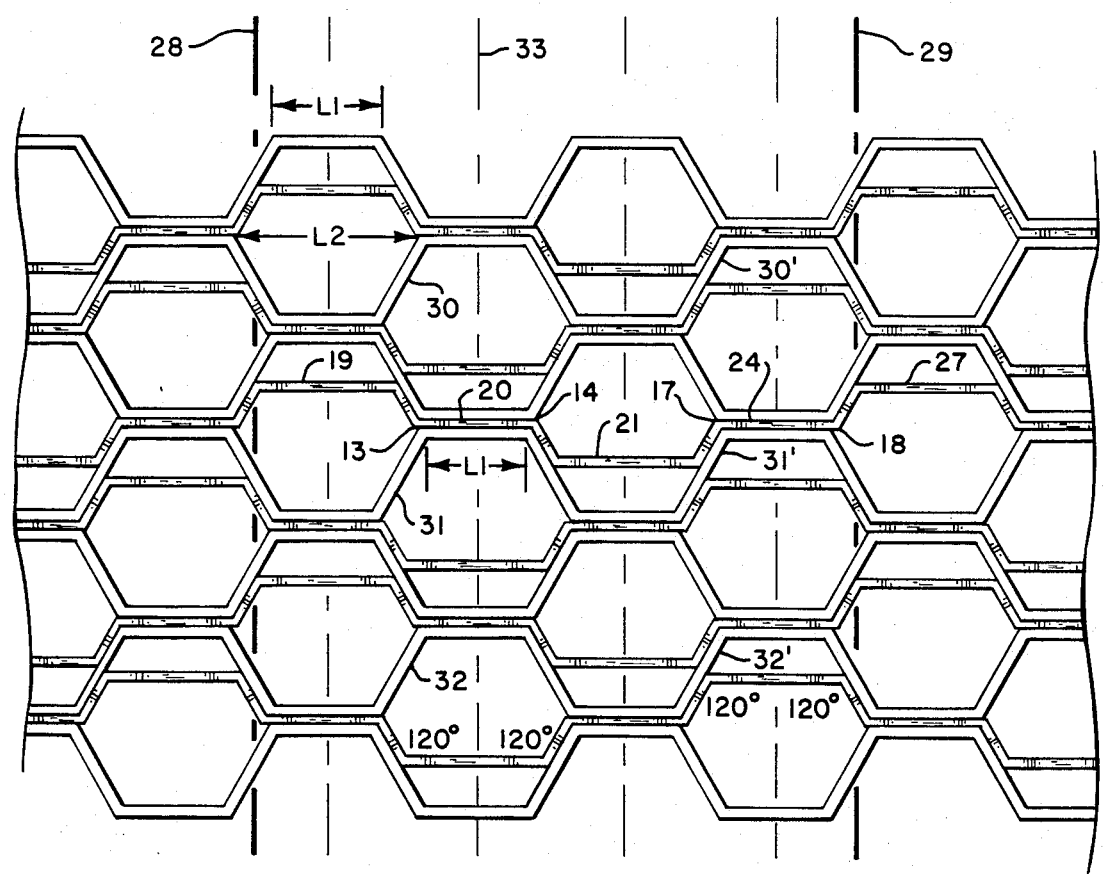
FIG. 2 is a side elevational view of a portion of a honeycomb cell array utilizing the strip of FIG. 1 useful in explaining the manner in which alignment of the cells is achieved.

Referring now to FIG. 2, the strip 10 is shown positioned between the second and third horizontal rows of honeycomb cells making up an array. In FIG. 2, the steps and some of the transverse fold lines are identified by the same numerals as the corresponding parts of FIG. 1.

Referring specifically to the top step 19, it will be noted that this step has a longitudinal length intermediate the length of a side of a cell such as indicated at L1 in one of the top row cells in FIG. 2 and the length between diametrically opposite vertices of the cell indicated at L2. The first intermediate step 20, on the other hand, has a longitudinal length corresponding to the length L1 of the side of a cell; that is, the length of the node of the cell to be welded.

The bottom step 21 preferably has a length equal to the top step 19 and the second intermediate step 24 again has a length corresponding to the length of the side of the cell L1.

With the foregoing dimensioning, it will be clear that the intermediate steps of each pattern are positioned between the nodes of honeycomb cells to be together so that the fold lines of the downwardly and upwardly sloping surfaces with the intermediate steps of the brazing foil index the cells into alignment with each other and hold the same in alignment while welding is carried out. In other words, the fold lines 13 and 14 in FIG. 2 will hold in vertical alignment the nodes of the honeycomb cells 30 and 31 while the fold lines 17 and 18 of this same strip will hold in vertical alignment the honeycomb cells indicated at 30' and 31' these latter cells being in horizontal alignment with the cells 30 and 31.

The strip of brazing material for the next horizontal row of cells, two of which are indicated at 32 and 32', will similarly index these cells in proper alignment with the cells 30, 31 and 30' and 31'.

It will further be noted from FIG. 2 that the angle between the planes of the sloping sections and the steps is 120° when the cells of the honeycomb array are hexagonal and the array of cells lies in a plane normal to the planes of the sides of the cells. In other words, when the array lies in the plane of the drawing of FIG. 2. This 120° angle is noted on the brazing strip for the bottom row of cells in FIG. 2.

While there has been shown in FIGS. 1 and 2 the preferred embodiment of the manner in which the brazing foil is folded, it should be understood that all that is really necessary is to carry out a partial folding of the brazing strip about transverse parallel pairs of fold lines spaced apart the same distance as the nodes of properly horizontally aligned cells, the transverse fold lines in each pair being spaced apart a distance equal to the length of the cell node. Thus, with reference to FIG. 1, one pair of fold lines might be 13 and 14 and a second pair of fold lines 17 and 18. The spacing between these respective pairs would correspond to the spacing between the horizontally aligned cells 31 and 30', for example, shown in FIG. 2. Further, it can be seen that the spacing between the fold lines making up each pair such as the fold lines 13 and 14 corresponds to the length L1 of the node as will also be clear from FIG. 2. It should also be noted that in the specific embodiment disclosed, these fold lines such as 13 and 14 take place in opposite directions; that is, if the fold line 13 is visualized as being made by folding upwardly the intermediate step 20, then the fold line 14 is made by folding downwardly the sloping section from the right hand end of the intermediate step 20. It is in this sense that the folds are "opposite".

It can be appreciated that so long as there is provided a consistent repetitive pattern with proper spacing between the fold lines, the brazing foil will function to index properly the cells in the array in proper alignment.

Figure 3:
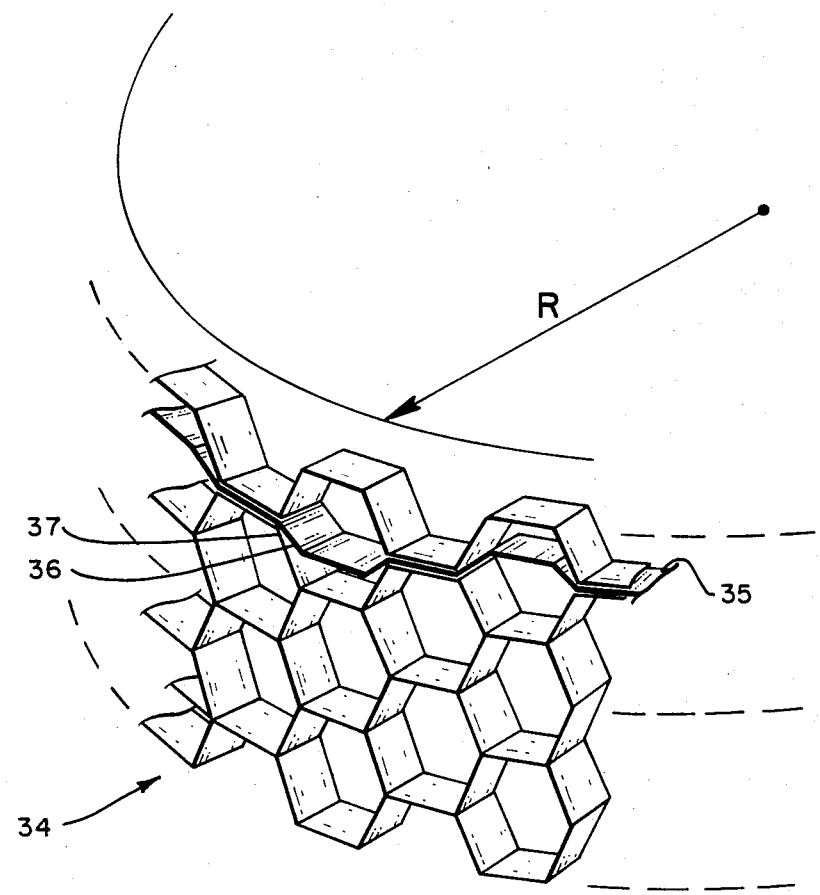
FIG. 3 illustrates a honeycomb cell array arranged to be formed into a curve for making a cylindrical honeycomb structure.

Referring now to FIG. 3 there is shown a portion of a honeycomb cell array 34 which is curved to follow a path having a radius of curvature R. This curving is done to provide a cylindrical honeycomb structure as might be used for a collar or seal. Such curving will tend to stretch the outer edges of the brazing strip between the nodes of the cells, this strip being depicted in FIG. 3 at 35. In accord with a feature of the method of this invention, the lengths of the sloping sections of the brazing strip are made sufficient to accommodate curving of the plane of the array of cells without unduly stretching the edges of the brazing foil on the convex side of the curve. Thus, these edges simploy pull away from the inside surfaces of the adjacent sides of the cells.

As a specific example of the foregoing, there is shown the outer edge 36 of one of the sloping sections of the strip 35 wherein the same has pulled away from the inside adjacent wall 37 of the honeycomb cell, this pulling away thus accommodating the stretching applied to the outer edge as a consequence of curving of the array about the radius of curvature R. Thus, undue stresses are not created in the brazing strip from such curving of the cell array.

Figure 4:
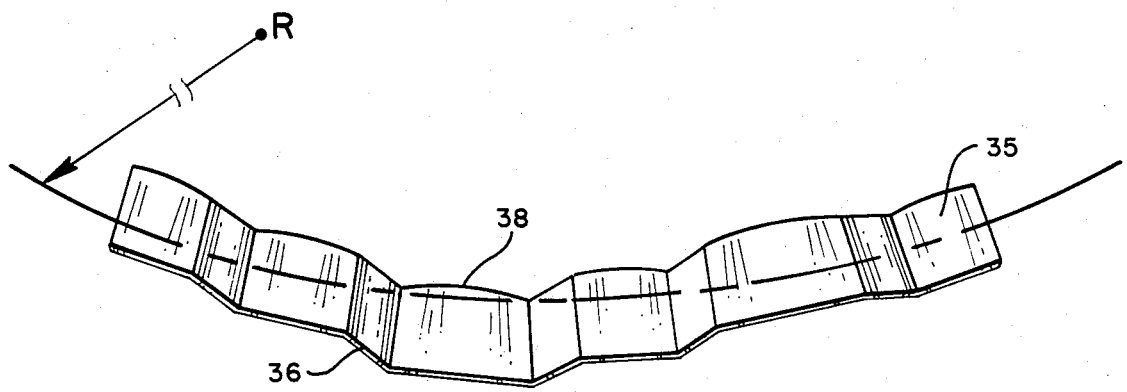
FIG. 4 is a perspective view of the brazing foil strip of FIG. 3 but separated from the various cells.

With specific reference to FIG. 4, there is shown the strip 35 separated from the cells wherein it will be noted that the inner edge of the strip corresponding to the concave side of the curving of the array will be compressed but such compression can be accommodated by a simple bowing upwardly or downwardly of this edge of the strip as indicated at 38. There is ample room within the interior of each of the cells to accommodate such bowing so that again undue stresses are not generated.

It will be understood that once the cells have been properly indexed by the brazing sttips and the welding of the nodes carried out, the brazing strips will function of braze the assembly to panels or other components. In this respect, the bridging portion between the nodes supplies sufficient brazing material to fill all of the fillets and corners resulting when planar sheets or panels are applied to one or both sides of the cells. In this respect, the brazing foil functions in the same manner as described in the aforementioned U.S. patent. Essentially, a unique use has been made of the bridging material of the brazing foil between the nodes by the shaping thereof as described herein to effect alignment of the cells.

From all of the foregoing, it will thus be apparent that the present invention has improved substantially the manufacturing techniques of honeycomb arrays wherein indexing pins, balls, and the like have been eliminated and yet proper alignment achieved without having to employ other "components".

We claim:

1. A method of aligning the nodes of honeycomb cells by means of a continuous strip of brazing material received between the nodes preparatory to welding the nodes together, including the steps of:
    (a) partially folding the brazing strip about transverse parallel pairs of fold lines spaced apart the same distance as the nodes of properly horizontally aligned cells, the transverse fold lines in each pair being spaced apart a distance equal to the length of the cell node; and
    (b) positioning the brazing material between the cell nodes so that a cell node is positioned between the two transverse fold lines making up each pair whereby the brazing strip indexes the positions of the cells into alignment with each other.

2. The method of claim 1, in which folding of the brazing strip about the two fold lines making up each pair is in opposite directions.

3. A method of aligning honeycomb cells in a desired array wherein the cell nodes receive a continuous strip of brazing foil, including the steps of:
  (a) partially folding the strip of brazing foil about transverse parallel fold lines in clockwise and counter-clockwise directions to define a series of descending and ascending steps defining a pattern which repeats, each pattern comprising:
    (1) a top step of length intermediate the length of the side of a cell and the length between diametrically opposite vertices of the cell,
    (2) a first intermediate step of length equal to the length of the side of a cell,
    (3) a bottom step of length equal to the length of the top step,
    (4) two downwardly sloping sections of equal length less than the length of a side of the cell connecting said top to said intermediate step and said intermediate step to said bottom step respectively,
    (5) a second intermediate step of length equal to the length of said first intermediate step,
    (6) two upwardly sloping sections of length equal to the length of said downwardly sloping sections connecting said bottom to said second intermediate step and said second intermediate step to the top step of the next pattern; and
  (b) positioning the intermediate steps of the pattern between the nodes of honeycomb cells to be welded so that the fold lines of the downwardly and upwardly sloping sections with the intermediate steps of the brazing foil index the nodes of the cells into alignment with each other and hold the same in alignment while welding is carried out.

4. The method of claim 3, in which the angle between the planes of said sloping sections and said steps is 120° when the cells of the honeycomb are hexagonal and the array of cells lies in a plane normal to the planes of the sides of the cells.

5. The method of claim 3, in which the lengths of the sloping sections are sufficient to accommodate curving of the plane of the array of cells without undue stretching of the edes of the brazing foil on the convex side of the curve, said edges simply pulling away from the inside surfaces of the adjacent side walls of the cells.

* * * * *